(12) United States Patent
Burger et al.

(10) Patent No.: US 10,746,212 B2
(45) Date of Patent: Aug. 18, 2020

(54) ADJUSTABLE SPACER SLEEVE

(71) Applicant: BÖLLHOFF VERBINDUNGSTECHNIK GmbH, Bielefeld (DE)

(72) Inventors: Ingo Burger, Schloß Holte-Stukenbrock (DE); Hans-Ulrich Figge, Schloß Holte-Stukenbrock (DE); Viktor Zelmer, Bielefeld (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 131 days.

(21) Appl. No.: 16/064,592

(22) PCT Filed: Dec. 22, 2016

(86) PCT No.: PCT/EP2016/082427
§ 371 (c)(1),
(2) Date: Jun. 21, 2018

(87) PCT Pub. No.: WO2017/109099
PCT Pub. Date: Jun. 29, 2017

(65) Prior Publication Data
US 2019/0003502 A1   Jan. 3, 2019

(30) Foreign Application Priority Data
Dec. 23, 2015   (DE) .................. 10 2015 122 744

(51) Int. Cl.
*F16B 5/02*   (2006.01)
*F16B 21/02*   (2006.01)
*B60R 9/058*   (2006.01)

(52) U.S. Cl.
CPC ............ *F16B 5/0233* (2013.01); *B60R 9/058* (2013.01); *F16B 21/02* (2013.01)

(58) Field of Classification Search
CPC ........ F16B 5/02; F16B 5/0216; F16B 5/0233; F16B 5/0283
See application file for complete search history.

(56) References Cited

U.S. PATENT DOCUMENTS

| 6,789,993 | B2 | 9/2004 | Ozawa et al. |
| 7,226,263 | B2 * | 6/2007 | Schwarzbich ........ F16B 5/0233 403/374.3 |

(Continued)

FOREIGN PATENT DOCUMENTS

| CN | 101135331 A | 3/2008 |
| CN | 205769036 U | 12/2016 |

(Continued)

OTHER PUBLICATIONS

English translation of the International Preliminary Report on Patentability for PCT/EP2016/082427 dated Jun. 26, 2018, (10 pages).

(Continued)

*Primary Examiner* — Jonathan P Masinick
(74) *Attorney, Agent, or Firm* — Reising Ethington P.C.

(57) ABSTRACT

An adjustable distance sleeve consisting of an outer sleeve, a hollow cylindrical inner sleeve as well as an abutment disc fastened to an axial collar of the outer sleeve. Due to the adaption in shape between the outer sleeve and the component opening, a rotation-proof fastening of the distance sleeve in the component is possible in a simple manner. Thereafter, the length adjustment of the distance sleeve takes place.

19 Claims, 12 Drawing Sheets

(56) References Cited

U.S. PATENT DOCUMENTS

| | | |
|---|---|---|
| 7,591,403 B2 | 9/2009 | Binder et al. |
| 7,891,927 B2 | 2/2011 | Burger et al. |
| 8,066,465 B2 | 11/2011 | Figge et al. |
| 8,202,033 B2* | 6/2012 | Choi .................... B62D 25/147 |
| | | 411/546 |
| 8,240,966 B2 | 8/2012 | Ulrich-Figge et al. |
| 8,267,630 B2* | 9/2012 | Moon ....................... F16B 5/02 |
| | | 411/110 |
| 8,337,132 B2* | 12/2012 | Steffenfauseweh .. B60Q 1/0433 |
| | | 403/408.1 |
| 8,764,337 B2* | 7/2014 | Binder .................. F16B 5/0283 |
| | | 403/343 |
| 8,864,432 B2 | 10/2014 | Ulrich-Figge et al. |
| 8,944,736 B2 | 2/2015 | Ulrich-Figge et al. |
| 9,302,716 B2* | 4/2016 | Sahi .................... B62D 27/065 |
| 9,771,962 B2 | 9/2017 | Metten et al. |
| 10,107,318 B2* | 10/2018 | Erpenbeck .............. F16B 5/025 |
| 10,253,800 B2* | 4/2019 | Sarazin ..................... F02C 7/00 |
| 2007/0207012 A1* | 9/2007 | Lorenzo ................ F16B 5/0233 |
| | | 411/546 |
| 2009/0067921 A1* | 3/2009 | Ito ......................... F16B 5/0283 |
| | | 403/408.1 |
| 2009/0263180 A1* | 10/2009 | De Gelis ............... F16B 37/005 |
| | | 403/22 |
| 2014/0097218 A1* | 4/2014 | Bittner ................... B60R 9/058 |
| | | 224/309 |
| 2019/0003502 A1 | 1/2019 | Burger et al. |

FOREIGN PATENT DOCUMENTS

| | | |
|---|---|---|
| DE | 19949654 A1 | 4/2001 |
| DE | 202005016823 U1 | 2/2006 |
| DE | 60119882 T2 | 5/2007 |
| DE | 202007008152 U1 | 8/2007 |
| DE | 202008011318 U1 | 11/2008 |
| DE | 202010002447 U1 | 6/2010 |
| DE | 102012007996 A1 | 10/2013 |
| DE | 102012102906 A1 | 10/2013 |
| DE | 102014201356 A1 | 7/2015 |
| EP | 2113421 A1 | 11/2009 |
| EP | 1533185 B1 | 12/2014 |
| EP | 2720907 B1 | 5/2015 |
| FR | 2925029 A1 | 6/2009 |
| WO | WO2014120707 A1 | 8/2014 |

OTHER PUBLICATIONS

CN Office Action for CN Application No. 201680076116.0 dated Apr. 17, 2019 (10 pages).

Written Opinion & International Search Report for PCT/EP2016/082427 dated Apr. 18, 2017, 14 pages.

* cited by examiner

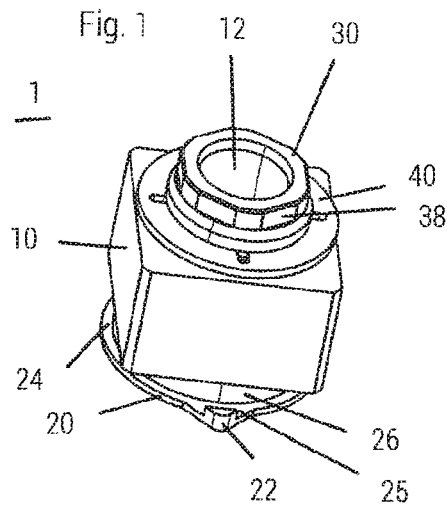
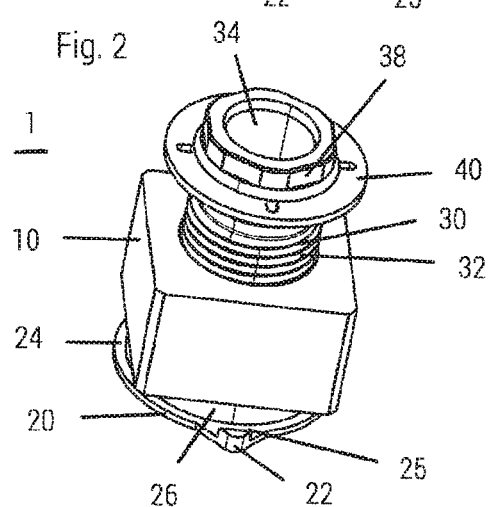
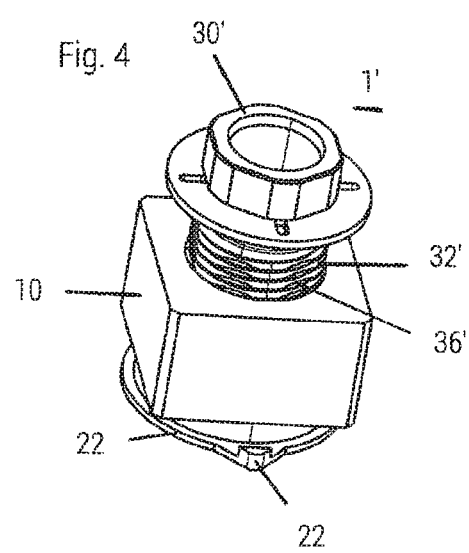
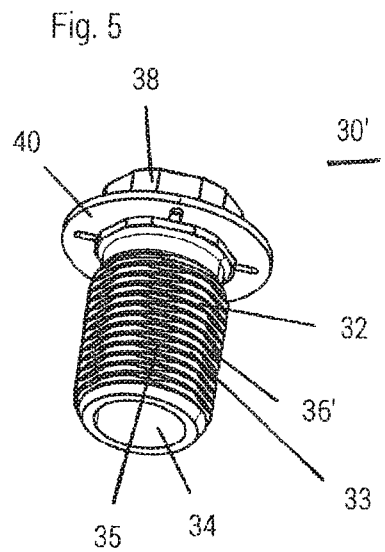
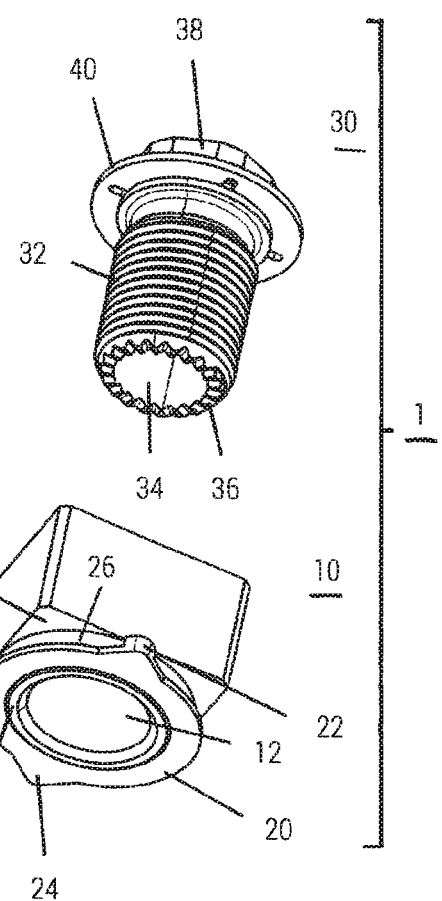

ADJUSTABLE SPACER SLEEVE

1. TECHNICAL FIELD

The present disclosure relates to an adjustable distance sleeve by means of which a distance between a first and a second component is bridgeable by adjusting a length of the distance sleeve. Further, the present disclosure relates to a connection between at least a first component and an adjustable distance sleeve as well as a method for installation of the adjustable distance sleeve in a non-round component opening of a first component and for connection with a second component.

2. BACKGROUND

For fastening a first component and a second component at each other, tolerance-compensating elements are known in the prior art which compensate the distance between the first and the second component automatically or manually actuated during screwing in of a fastening screw. At the automatic tolerance compensation, the fastening screw rotates the inner sleeve by means of an inner dragger of the inner sleeve of the tolerance-compensating element so that the tolerance-compensating element is extended until it abuts at both components. Thereafter, both components block a further extension of the tolerance-compensating element. The disadvantage of these tolerance-compensating elements is that especially at easily deformable components already the abutment and further dragging of the inner sleeve by means of the fastening screw may lead to a bulging of at least one of the components to be connected to each other. Such a tolerance-compensating element is described in DE 20 2010 002 447 U1.

At distance sleeves that are manually actuated by means of a tool, the disadvantage is that they have to be secured or fastened by means of a special tool before they are braced between the two components as the fastening screw as fastening element of the distance sleeve is not yet inserted.

A distance sleeve which can be adjusted in its length by means of a tool is described in EP 1 533 185 B1. Here, the distance sleeve is inserted into a keyhole of a supporting part and is hold there in a rotation-proof manner by means of a tool. Further, the tool establishes a connection with a drive means in the interior of an adjusting sleeve of the distance sleeve. Solely by means of this inner engagement, the length of the distance sleeve is adjusted to the distance of the two components to be connected to each other, here the supporting part and a roof cover of a motor vehicle. Subsequently, both components are connected to each other by means of a fastening screw running through the adjustable distance sleeve. This construction has the disadvantage that a complex tool is required for fastening the distance sleeve in the keyhole of the supporting part. First of all, this tool holds the distance sleeve in its position. Further, this tool realizes a rotation blocking of the one sleeve of the distance sleeve. Further, the tool provides an engagement means that establishes a rotation connection with the drive means in the interior of the adjusting sleeve of the distance sleeve. Besides the high constructional effort for the tool for the installation of the distance sleeve, the keyhole used here has the disadvantage that the distance sleeve may be very easily released from the keyhole prior to the complete fastening of the distance sleeve. Installation errors and additional installation effort are related thereto.

A further adjustable distance sleeve for fastening a roof bar at a supporting structure of a motor vehicle is described in EP 2 720 907 B1. At this distance sleeve, the distance between a supporting part and a roof cover is also adjusted by means of an internally arranged drive means of the adjusting sleeve. Additionally, this distance sleeve provides besides a supporting on the supporting part also an adjustment of the distance sleeve to the angular position of the supporting part. This adaptability ensures that possible free spaces during the installation of the distance sleeve on the supporting part are closed. Thus, later setting procedures are avoided which may eventually lead to a releasing or loosening of the roof construction. Overall, the here described adjustable distance sleeve is complex in its construction and installation.

It is therefore an object of at least some embodiments of the present invention to provide a construction of an adjustable distance sleeve which is simplified compared to the prior art and which makes possible an efficient installation of the adjustable distance sleeve besides an efficient supporting and fastening of two adjacent components.

3. SUMMARY

The above object is solved in at least some embodiments by an adjustable distance sleeve, a connection between at least a first component and an adjustable distance as well as by a method for installation of a distance sleeve. Advantageous embodiments of the present invention result from the following description, the accompanying drawings, and the appending claims.

By means of the adjustable distance sleeve, a distance between a first and a second component is bridgeable by adjusting a length of the distance sleeve. For this reason, the distance sleeve comprises the following features: an outer sleeve having a central thread opening, a hollow cylindrical inner sleeve arranged adjustably in the central thread opening, the inner sleeve having an outer thread at a radial outer side which corresponds to an inner thread of the thread opening, and an axial collar extending in an axial direction from a face side of the outer sleeve at which a radially extending abutment disc is arranged in a non-rotating manner, and the abutment disc comprises at least one fastening feature extending in the direction of the outer sleeve into a portion between abutment disc and outer sleeve by means of which a form-fit rotation lock and/or a force-fit rotation lock can be established in an opening of the first component.

The adjustable distance sleeve consists in the known manner of an outer sleeve having a thread opening in which a hollow cylindrical inner sleeve is displaceable arranged by means of rotation. By means of this rotation in the above described thread connection, the appropriate length of the distance sleeve is adjusted. At a side facing the first component, the distance sleeve defines a portion, that may be in the shape of a fastening gap by means of an axial collar. The one radial boundary surface of the fastening gap is defined by the radially extending abutment disc. The other boundary surface of the fastening gap is formed by the axial face side of the outer sleeve. As the distance sleeve may be fastened in the component opening by an axially inserting and subsequent rotation around its longitudinal axis, the edge of the component opening is received in the fastening gap portion between abutment disc and face side of the outer sleeve. Based on this rotation around the longitudinal axis of the distance sleeve, the fastening feature provided at the abutment disc engages in the component opening in a rotation-inhibiting manner. Therefore, after this engagement or after this locking, respectively, a loosening may be only possible by means of a destruction of the distance sleeve or the abutment disc. Accordingly, a new abutment disc may be fastened in that case at the axial collar to be able to install the outer sleeve again. Besides a form-fit rotation lock, it may also be preferred that the distance sleeve is clamped in a rotation-proof manner at the edge of the component opening of the component due to the rotation of the distance sleeve.

According to an embodiment, the outer sleeve and the abutment disc comprise each an outer contour extending radially beyond the axial collar for forming the above mentioned fastening gap portion.

According to a further embodiment, the abutment disc is formed resiliently in axial direction of the distance sleeve and comprises at least one rotation-lock web projecting into the fastening gap portion. Thus, the rotation-lock web at the abutment disc is preferably oriented in the direction of the outer sleeve. Due to this construction, the rotation-lock web may engage into a non-round opening of the first component for receiving the axial collar or it is lockable in a lock opening or in a lock-groove of the first component adjacent to the component opening. As can be seen based on this construction, the outer shape or contour of the distance sleeve may be adapted to the non-round shape of the component opening. This ensures that the distance sleeve is insertable with its fastening gap into the component opening in one orientation. As soon as the distance sleeve is rotated around its longitudinal axis after the insertion, the non-round component opening and the outer contour of the distance sleeve adapted thereto support a fastening of the distance sleeve in the component opening together with a form-fit connection in axial direction. Thereby, the edge of the component opening is received in the fastening gap portion such that the rotation-lock web ensures due to its further rotation inhibition of the distance sleeve in the component opening also an axial fastening of the distance sleeve in the component opening.

According to a further embodiment, the abutment disc is formed non-resiliently in axial direction and it comprises at least one ramp surface projecting into the fastening gap portion. Likewise, this embodiment of the distance sleeve is used in combination with a non-round opening of the first component. As the distance sleeve has been inserted into the non-round component opening solely due to an axial movement of the distance sleeve, a rotating around the longitudinal axis of the distance sleeve creates a frictional connection between the distance sleeve and the first component. Thereby, the edge of the component opening in the first component is clamped into the fastening gap portion, wherein the ramp surface presses against the side of the first component facing away from the outer sleeve. Thus, the edge of the component opening of the first component is clamped between the ramp surface and the face side of the outer sleeve limiting the fastening gap portion.

According to a further embodiment, the inner sleeve of the distance sleeve comprises a threadless through-opening and at least one drive means by means of which the inner sleeve is rotatable in the outer sleeve and the length of the distance sleeve is adjustable. Further, the drive means of the inner sleeve may be arranged within the through-opening by means of a non-round inner contour, may be a polygonal contour. Based on this construction, the interior of the distance sleeve is engageable by an Allen key, wherein the inner contour of the through-opening of the inner sleeve establishes a form-fit rotation connection with the inserted Allen key. Certainly, also all other contours for the through-opening of the inner sleeve are preferred by means of which a form-fit rotation connection with a respectively formed tool may be realized.

Further, the drive means of the inner sleeve may be arranged at an axial face side of the inner sleeve, which makes a form-fit rotation connection with a tool possible. In this context, a gearing between the axial face side of the inner sleeve and a tool or a form-fit engagement or abutment of the tool in the sense of a groove-tongue-connection may be preferred as they make a reliable rotating of the inner sleeve within the outer sleeve possible.

According to a further embodiment, the drive means of the inner sleeve is arranged at the radial outer side of the inner sleeve, which comprises a polygonal or a non-round contour having a plurality of radial elevations on which the outer thread of the inner sleeve is arranged while a free space as drive means for the engagement or abutment of a tool is present between adjacent radial elevations. By means of this design of the outer side of the inner sleeve, the outer side of the inner sleeve realizes two functions at the same time. The one function consists of ensuring the thread engagement in the inner thread of the outer sleeve. The further function ensures engagement or abutment possibilities, respectively, for a tool so that the inner sleeve is rotatable around the longitudinal axis of the distance sleeve. Thus, it may be for example preferred to provide the outer contour of the inner sleeve as triangular, four sided or hexagonal. At this, the threads for the engagement with the inner thread of the outer sleeve are arranged each on the radial outermost edge surfaces. Between the radially elevating thread edges, sufficiently large free spaces are available into which a tool may engage for rotating the inner sleeve around its longitudinal axis.

According to a further embodiment, the tool engagement or tool abutment, respectively, is only ensured from the axial face side of the inner sleeve facing the fastening gap portion. It may be also preferred to engage the free space provided for the rotation with the tool also from the axial face side of the inner sleeve which is opposite to the fastening gap portion. In the same way, also the drive means at the face side may be arranged at both or only at one axial face side of the inner sleeve.

According to a further embodiment, the inner sleeve comprises a threadless through-opening and no drive means, wherein the inner sleeve is rotatable manually or by means of a frictional connection between a tool and an inner wall of the through-opening. For being able to adjust the distance sleeve properly to a distance between two components to be connected to each other, the inner sleeve is screwed into the outer sleeve respectively. The torque, preferably of a tool, which may be required for the rotation of the inner sleeve is transmitted to the inner sleeve by means of an operative connection between tool or fastening screw and inner sleeve.

For the generation of a frictionally engaged operative connection, the inner sleeve may comprise at least one annular elastic dragging member which narrows the through-opening of the inner sleeve. This results in that the dragging member and thus the inner sleeve are rotated by means of the fastening screw while screwing in of the fastening screw into the distance sleeve until the inner sleeve abuts the second component. The term inner sleeve also includes one or more radial elastic rings, such as e.g. O-rings or radial sealing rings, which are formed and arranged in the through-opening in grooves which may be adapted to their shape. At several rings, the individual grooves could also be reduced in diameter such that the individual rings largely correspond in function to an inner sleeve having several sealing edges and having a slight insertion cone in the mounting direction.

The resistance against a further displacement of the inner sleeve in the axial direction resulting from the abutment at the second component ensures that the fastening screw overcomes the frictional engagement with the dragging member. Accordingly, the fastening screw is screwed further into the nut, without rotating the inner sleeve by means of the dragging member.

According to the at least some implementations of the invention, a radially inwardly protruding sealing lip may be provided at the dragging member, which is arranged circumferentially at the dragging member and can abut a fastening screw in a sealing manner. While the elastic dragging member allows a simplified adjustment of the length of the distance sleeve in combination with the screwing in of the fastening screw, it realizes a sealing of the through-opening of the inner sleeve with the aid of the circumferential sealing lip. For this purpose, the sealing lip protrudes radially inwardly and extends along an inner circumference of the dragging member. Thus, the sealing lip narrows the through-opening of the inner sleeve such that it abuts circumferentially and continuously at the fastening screw as soon as it is installed in the distance sleeve. In this way, a labyrinth seal between the outer thread of the inner sleeve and the inner thread of the outer sleeve as well as the seal between the fastening screw and dragging member having a sealing lip complement each other. This reduces the entering of dirt, dust and liquid into the adjustable distance sleeve and protects the connection between the at least two components.

Further, the inner sleeve may comprise an insertion cone into the through-opening of the inner sleeve adjacent to an end face. By means of this insertion cone, a frictional engagement with a rotary tool can be established, so that the inner sleeve can be rotated and adjusted even without a positive locking with a tool. A preferred tool may be, for example, a pin with tapered elastic cone. The elastic cone may be formed larger in its maximum diameter than an inner diameter of the through-opening of the inner sleeve. In this way, an inserting of the elastic cone may constitute a frictional connection with the inner sleeve, so that the inner sleeve can be screwed into the outer sleeve with the rotary tool.

The present disclosure describes a connection between at least a first component and an adjustable distance sleeve, especially an adjustable distance sleeve according to the above described construction alternatives, in which the first component comprises a non-round component opening and an edge of the component opening is fastenable in a fastening gap of the distance sleeve solely by means of an axially inserting and subsequent rotating of the distance sleeve within the component opening.

In this context, it may be preferred that an outer contour of the outer sleeve of the distance sleeve is adapted to the non-round component opening such that in a first rotation angle orientation around a longitudinal axis of the distance sleeve, an axial inserting of the distance sleeve into the non-round component opening is ensured, while in a second rotation angle orientation of the distance sleeve, an axial removing of the distance sleeve from the non-round component opening is prevented by form-fit.

According to this construction manner, the adjustable distance sleeve may be locked in the component opening by a simple linear inserting or plugging-in, and rotating around the longitudinal axis. The locking takes place by means of a form-fit connection based on the above described constructive features. The constructive basis for this form-fit connection forms the non-round component opening as free spaces into which a form-fit rotation lock, as for example a rotation-lock web, may engage are especially created during a rotation of the distance sleeve within the non-round component opening. At the same time, the non-round component opening ensures that an edge of the component opening is arranged within the fastening gap portion such that at least in some portions of the component opening this edge is held between the axial face side of the outer sleeve and the abutment disc of the distance sleeve.

According to a further embodiment, the above described connection may be qualified in that the distance sleeve is supported at the second component by means of a rotatingly adjustable inner sleeve and the first and the second component are connected to each other by means of a fastening screw which extends through the distance sleeve, in particular through a through-opening of the inner sleeve.

Furthermore, the present disclosure comprises a connection between a first and a second component with the aid of the adjustable distance sleeve in its embodiments, wherein a fastening screw extends through the distance sleeve.

The present disclosure comprises further a method for installing a distance sleeve, especially a distance sleeve according to the above described construction alternatives, into a non-round component opening of a first component. The method comprises the following steps: inserting or plugging-in of an outer sleeve of the distance sleeve, especially an outer sleeve having a pre-mounted inner sleeve and preferably a distance sleeve screwed together to a short length, into the non-round component opening, the outer contour of which is adapted to the non-round component opening, until an edge of the non-round component opening is supported on an abutment disc of the distance sleeve, rotating the outer sleeve around a longitudinal axis so that the edge of the non-round component opening is received in a fastening gap portion between the abutment disc and the outer sleeve and thereby snapping-in or locking of a rotation-lock web projecting into the fastening gap portion into the non-round component opening or into a lock opening or into a lock groove at the first component and/or clamping a ramp surface projecting into the fastening gap portion at a side of the first component facing the ramp surface. According to at least some implementations of the invention, it may be preferred that the first component is a support in the roof portion of a vehicle body at which a roof body is supported by means of an inner sleeve of the distance sleeve, wherein the distance sleeve is installed in the component opening only from one side opposite the roof body. Based on the above described construction alternatives of the distance sleeve and the support, an only one-side accessibility of the distance sleeve from the vehicle interior is sufficient for adjusting the distance sleeve appropriately in its length. Thereby, it is advantageous that the distance sleeve locks rotation-proof in the non-round component opening of the support so that no additional tool is necessary for fastening and for avoiding a rotation of the outer sleeve of the distance sleeve.

According to further embodiments, the above method comprises the further steps: rotating the inner sleeve of the distance sleeve for bridging a distance between the first component and the second component with (i) a tool that establishes a frictional connection in a through-opening of the inner sleeve without drive means, or (ii) a tool that establishes a form-fit rotation connection with a drive means at an axial face side of the inner sleeve, or (iii) a tool that establishes a form-fit rotation connection with a drive means at a radial inner side or a radial outer side of the inner sleeve.

Moreover, in the context of the method, it may be preferable to establish a sealing connection in the through-opening of the inner sleeve between the fastening screw and a sealing lip extending circumferentially around the fastening screw. In this way, at least the interior of the through-opening is protected against an entering of contamination and/or liquid, whereby maintenance effort and corrosion are reduced and the durability of the adjustable distance sleeve and the established connection is improved.

4. BRIEF DESCRIPTION OF THE ACCOMPANYING DRAWINGS

Representative embodiments of the present invention are described in detail with reference to the accompanying drawings. It shows:

FIG. 1 is a perspective view of a first embodiment of the distance sleeve,

FIG. 2 is the distance sleeve according to FIG. 1 which has been elongated by screwing the inner sleeve out of the outer sleeve, FIG. 3 is an exploded view of the distance sleeve of FIG. 1 consisting of outer sleeve and inner sleeve, FIG. 4 is a further embodiment of the distance sleeve with a modified inner sleeve, FIG. 5 is the inner sleeve of the distance sleeve according to FIG. 4.

Figure 6:
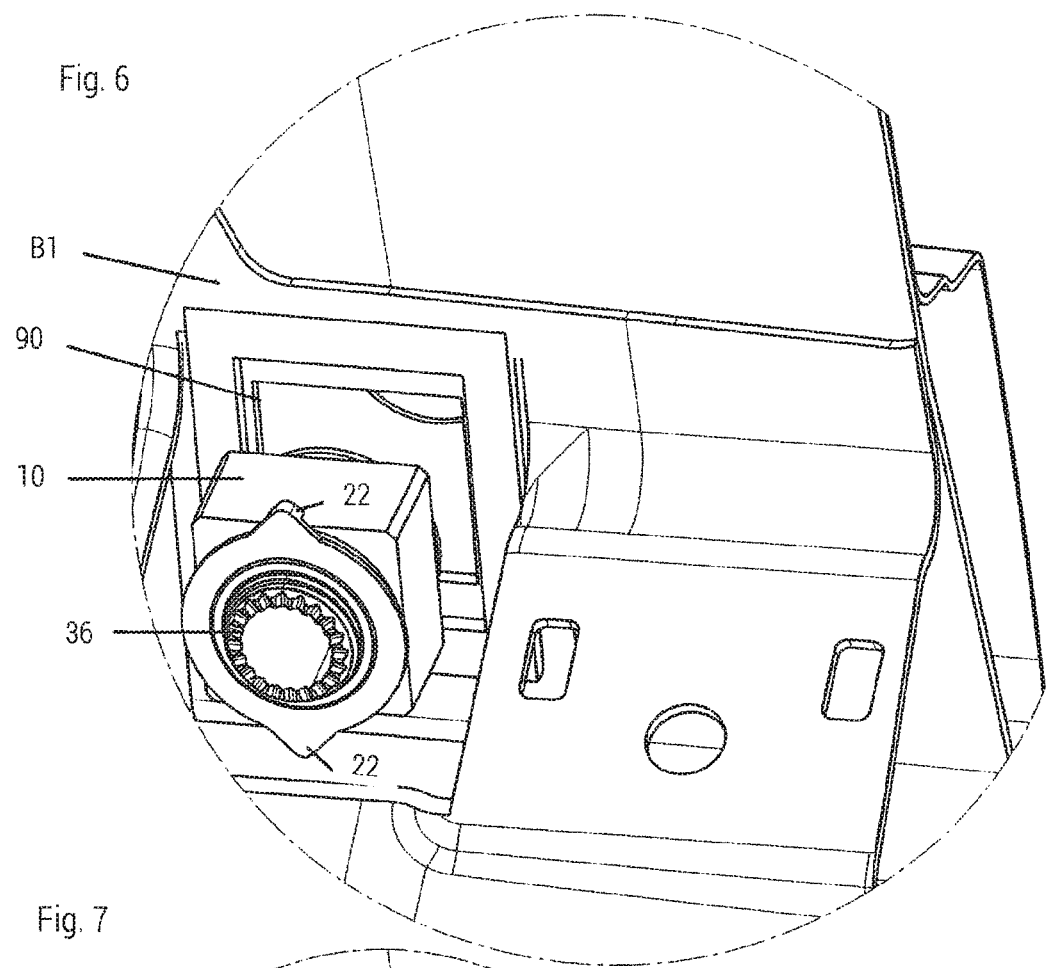
Figure 7:
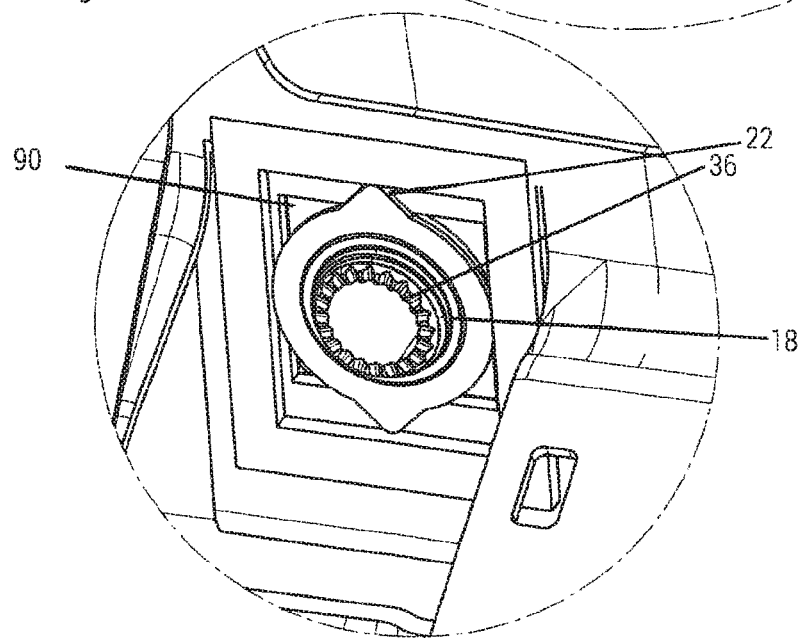
Figure 8:
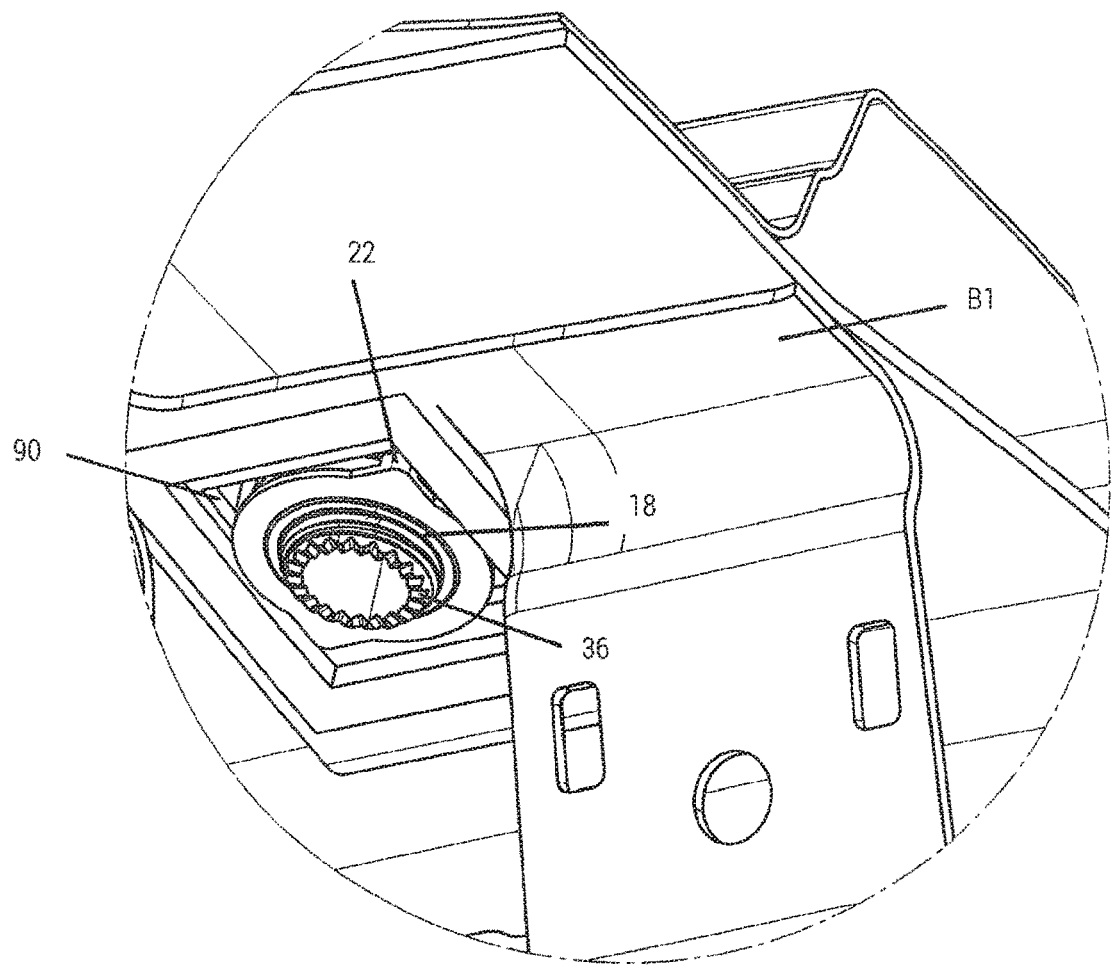
Figure 9:
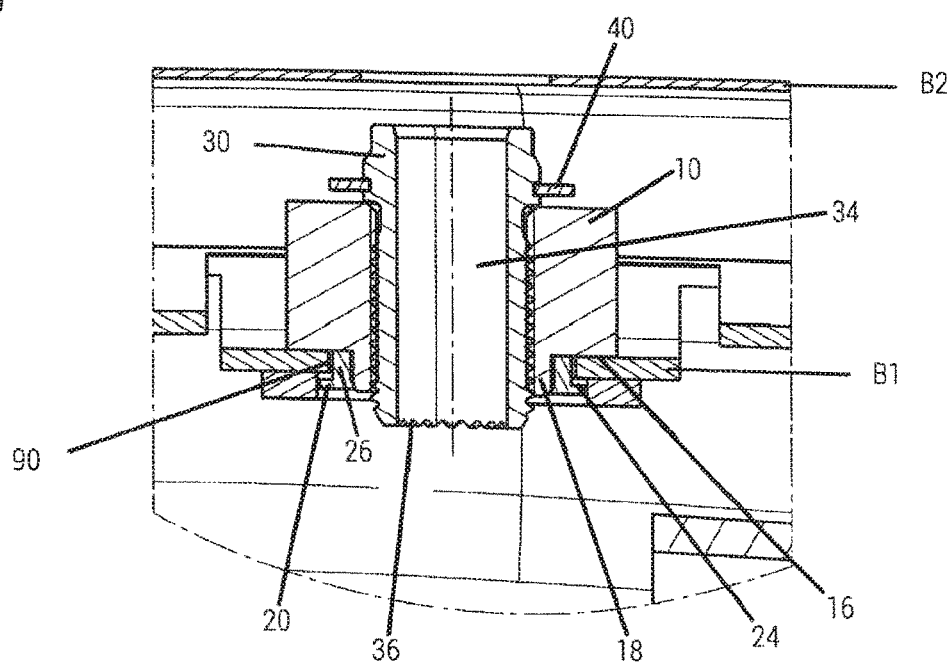
Figure 10:
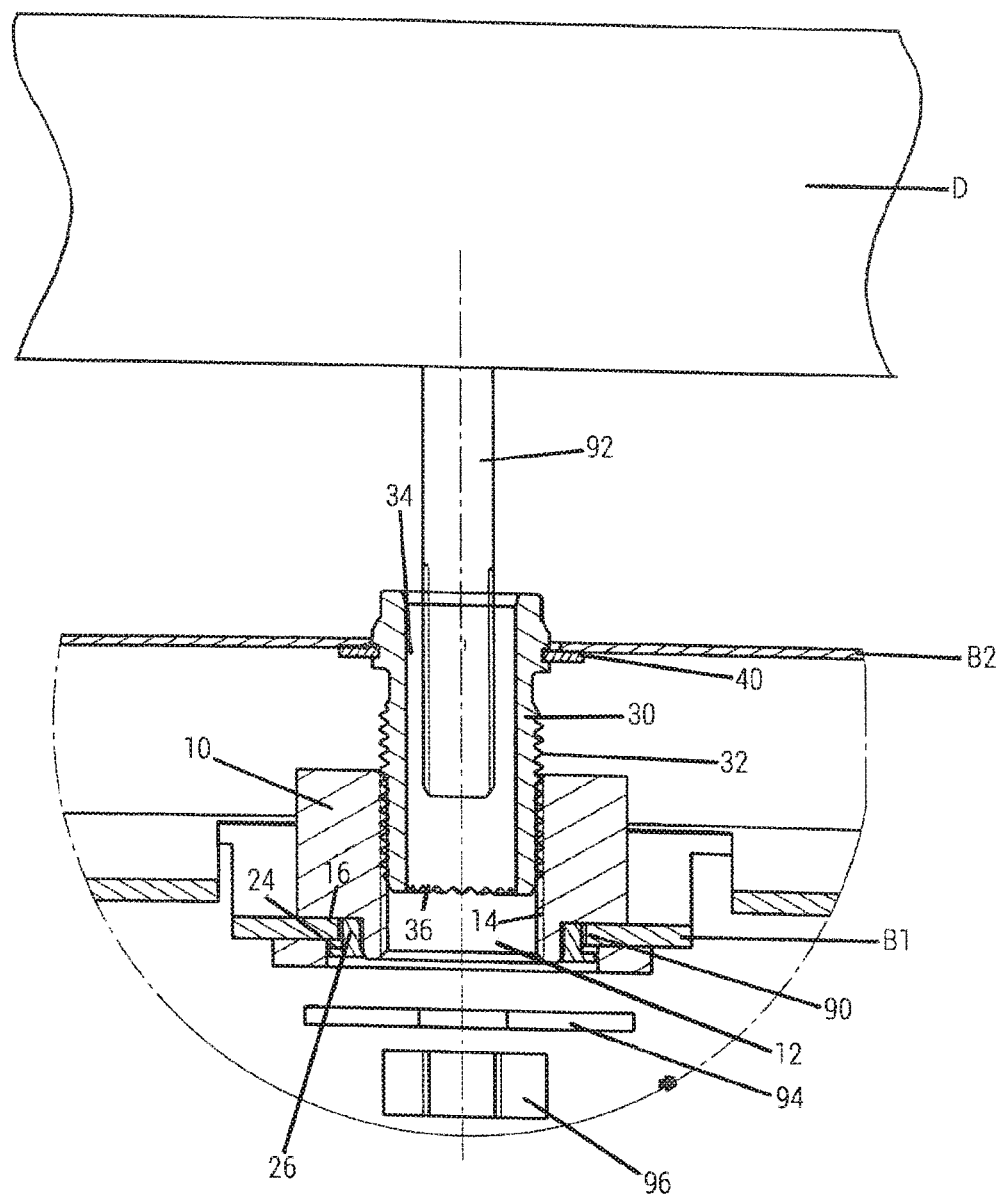
Figure 11:
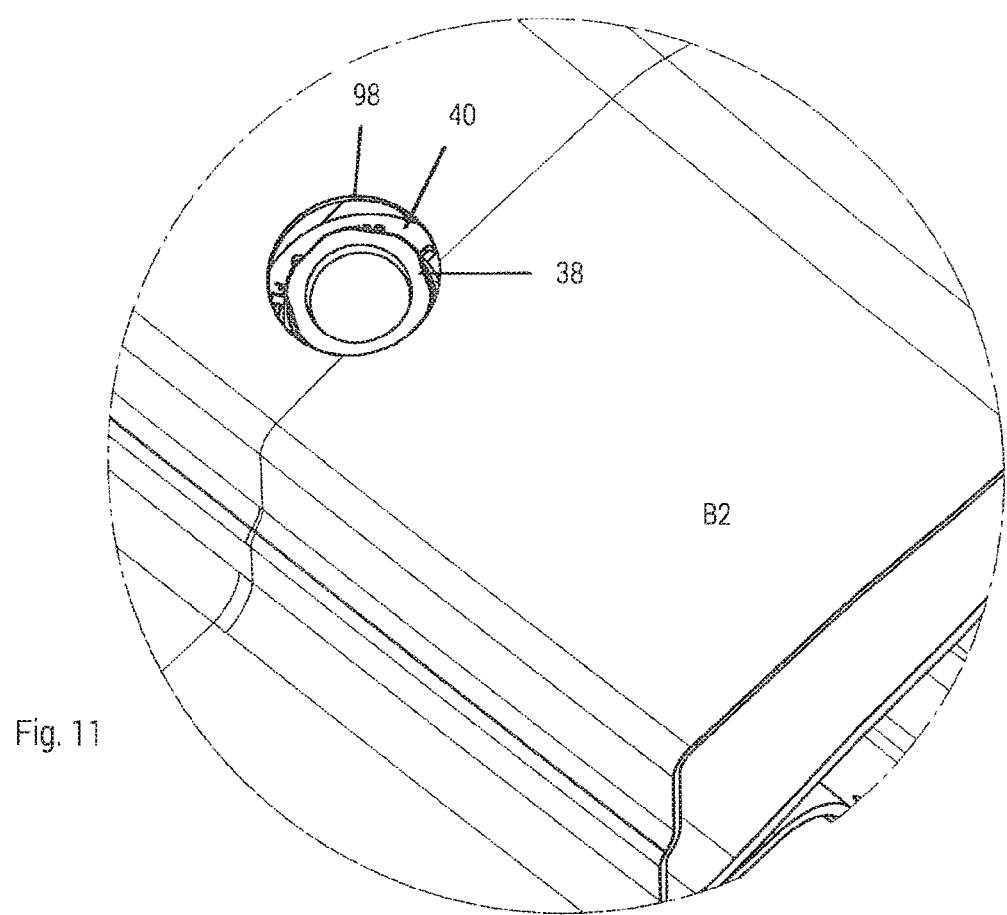
Figure 12:
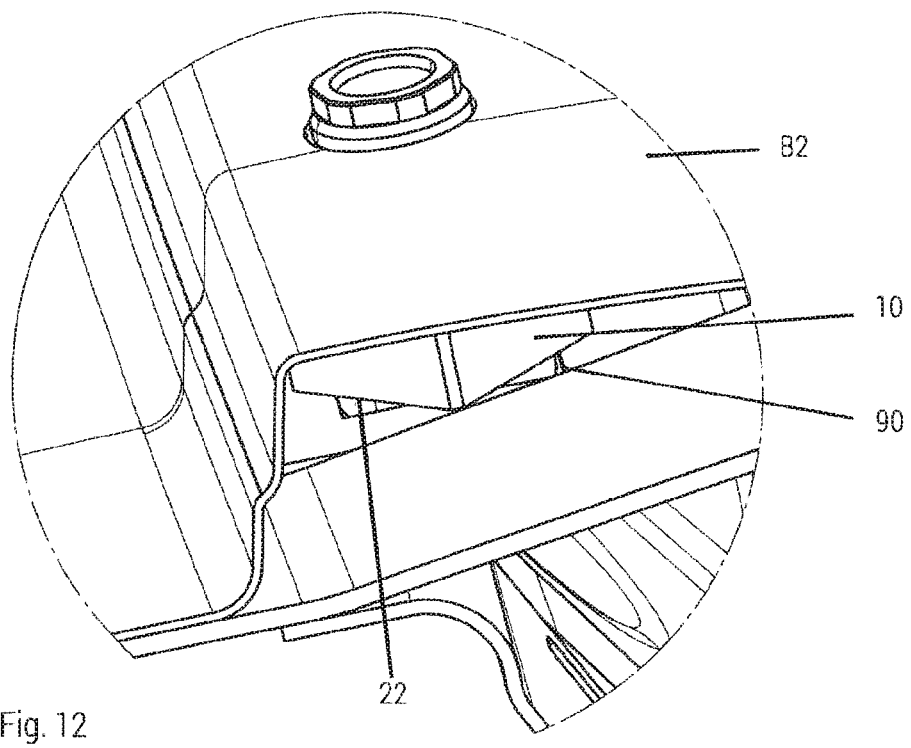
Figure 13:
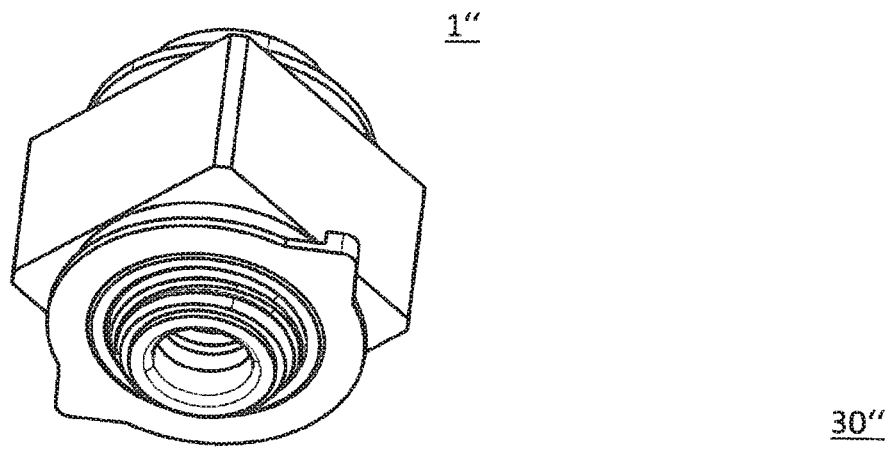
Figure 14:
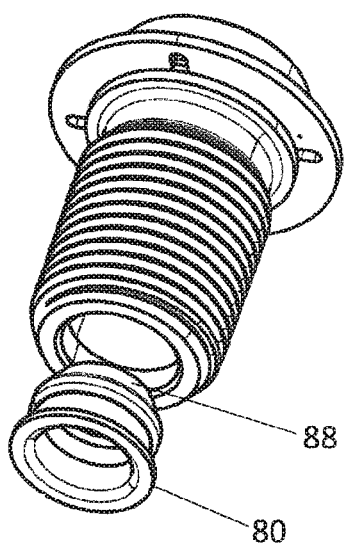
Figure 15:
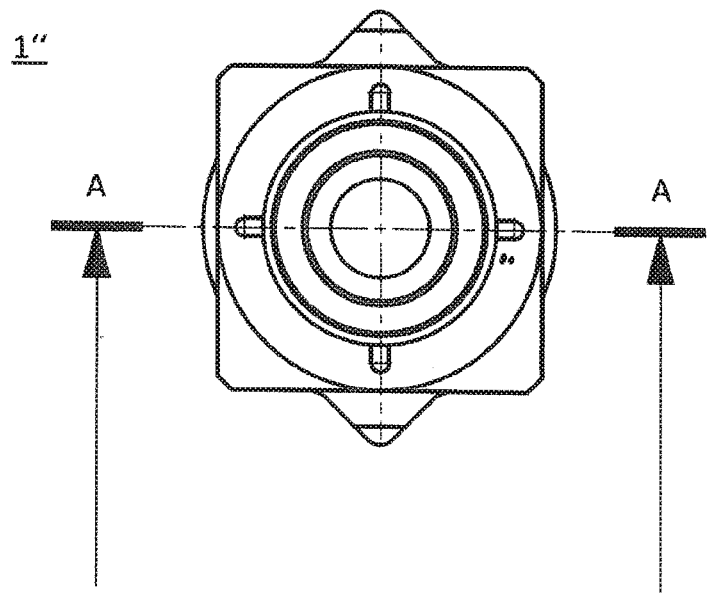
Figure 16:
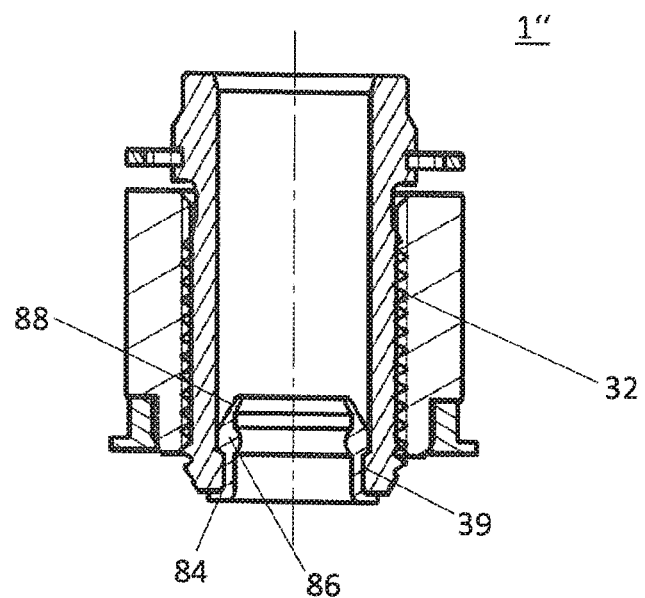
Figure 17:
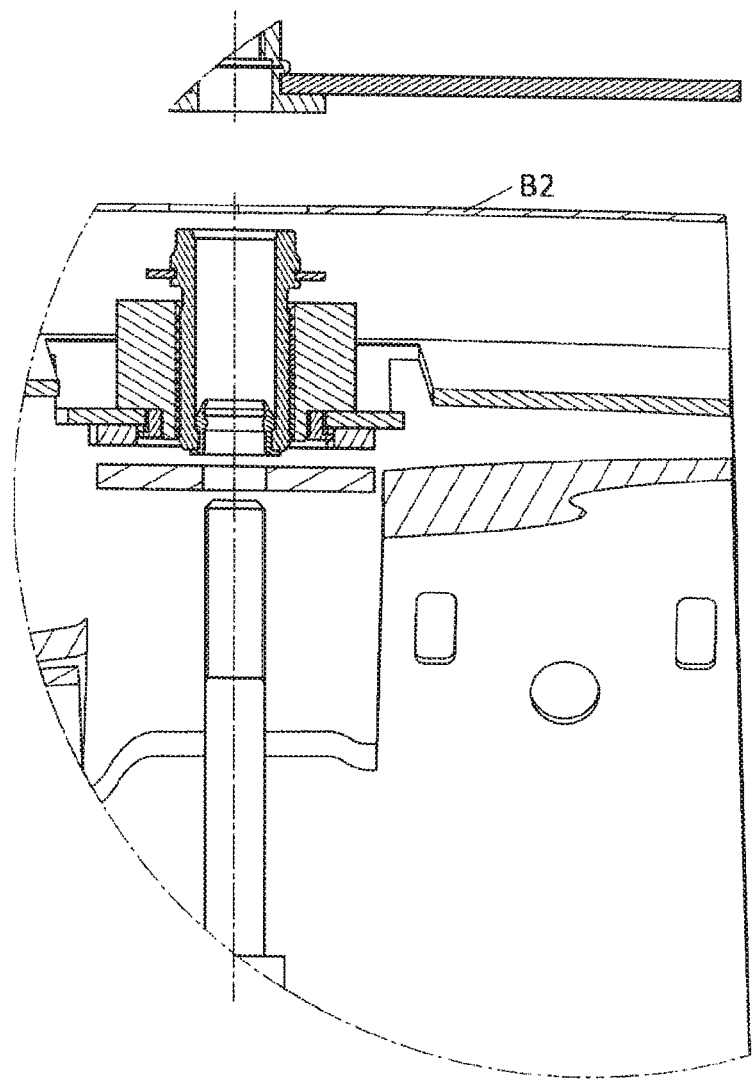
Figure 18:
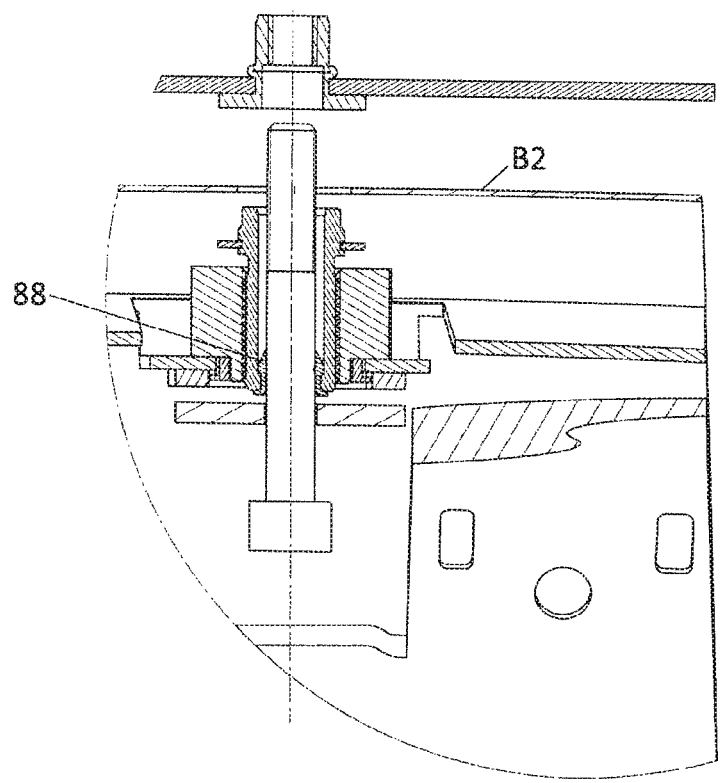
Figure 19:
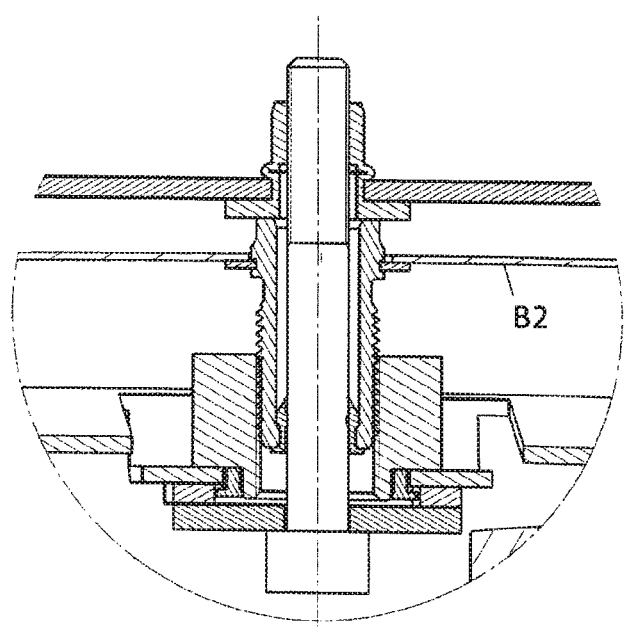
Figure 20:
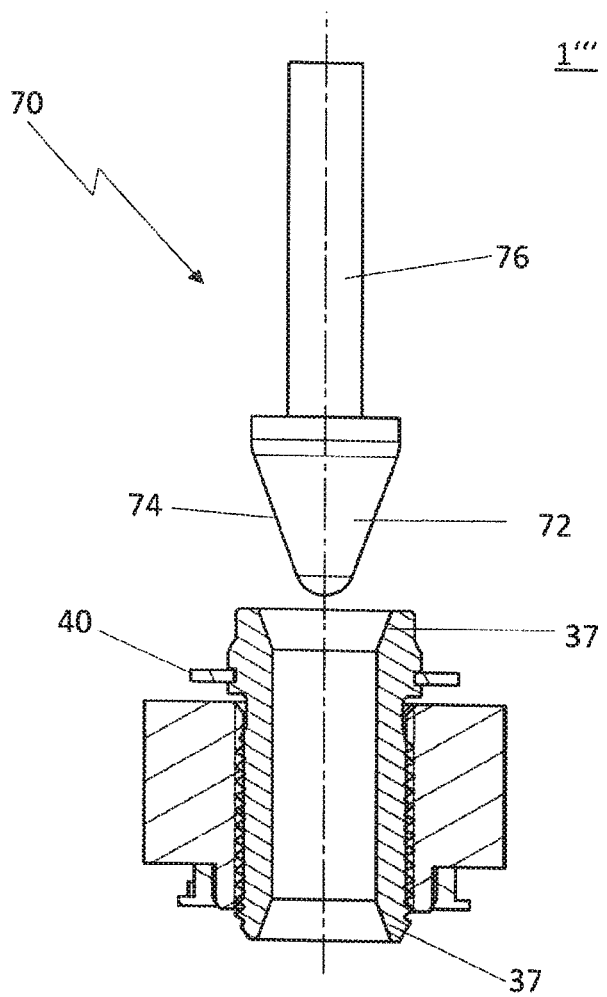
Figure 21:
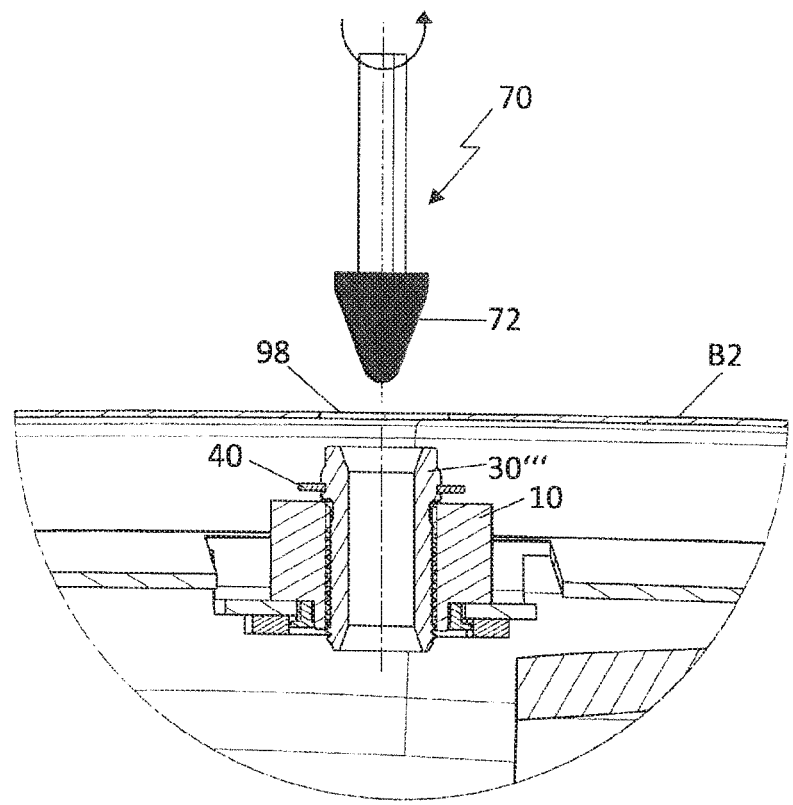
Figure 22:
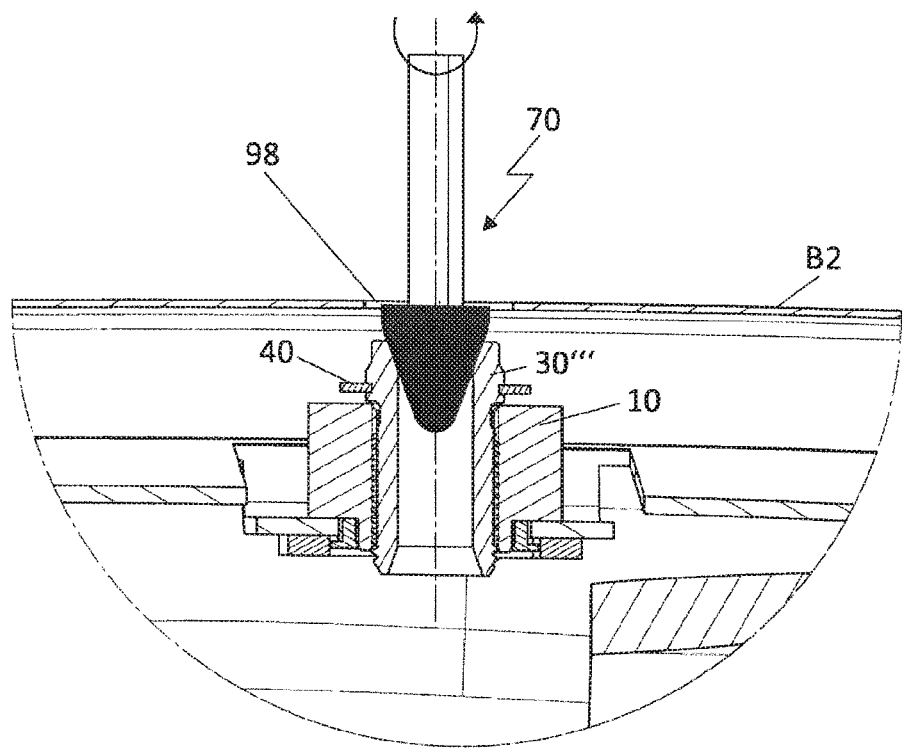
Figure 23:
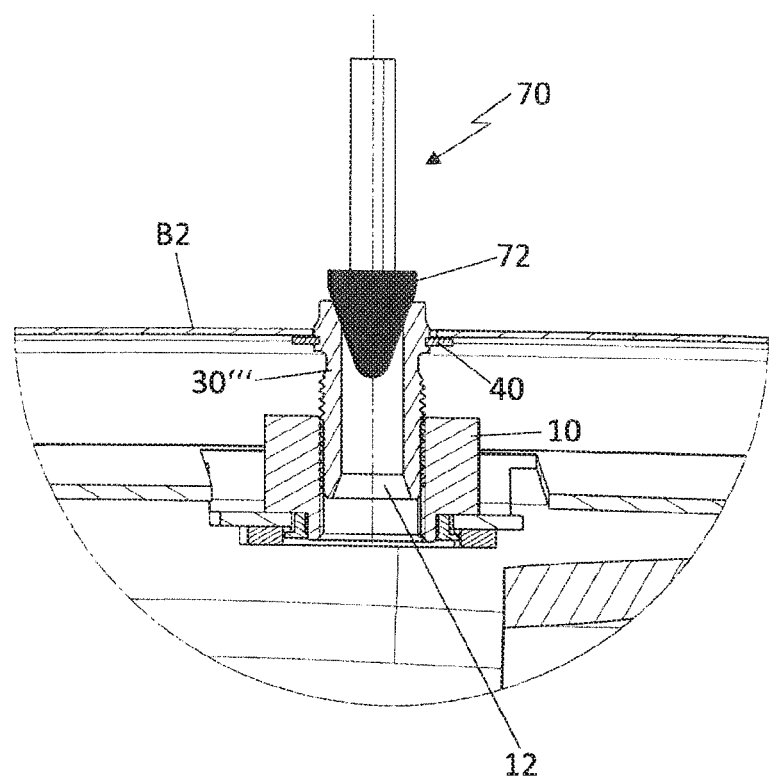
Figure 24:
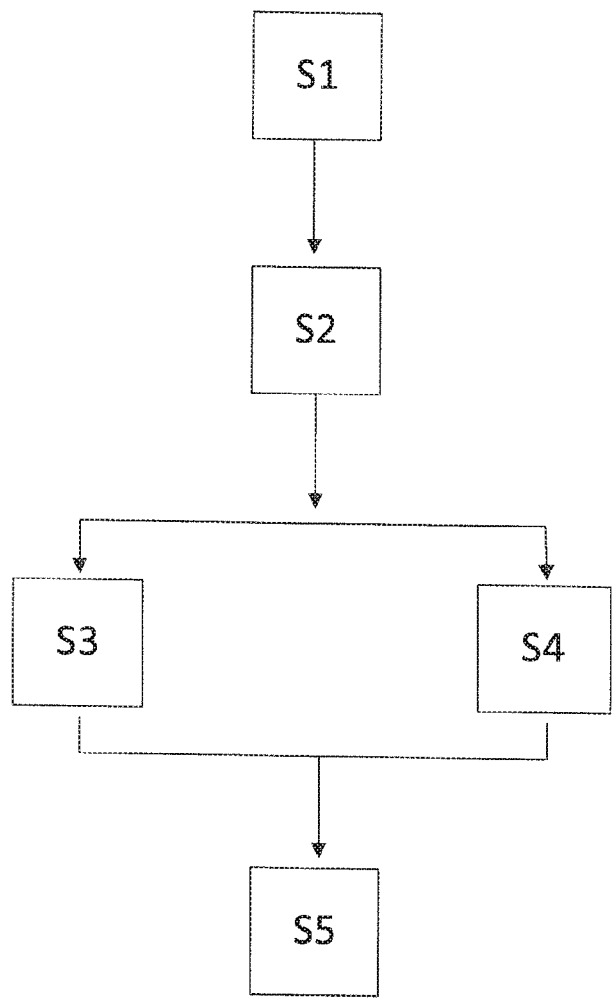

FIG. 6 is an installation sequence before the distance sleeve is inserted into a component opening, FIG. 7 is the distance sleeve in a perspective view from the bottom after it has been inserted axially in the component opening, FIG. 8 is the distance sleeve in a perspective side view after it has been rotated within the component opening around its longitudinal axis, FIG. 9 is a cross-sectional view of an embodiment of the distance sleeve installed in the component opening of the first component, FIG. 10 is a cross-sectional view of an embodiment of the distance sleeve in an installed condition between the first and second component before the fastening screw has been screwed in, FIG. 11 is a perspective view of a component opening in the second component in which an axial end of the preferred inner sleeve is visible, FIG. 12 is a perspective view of the distance sleeve in the component opening of the first and second component, FIG. 13 is a perspective view of an embodiment of the distance sleeve, FIG. 14 is a perspective view of an embodiment of the inner sleeve in an exploded view with an installable elastic friction element, FIG. 15 is an end view of the distance sleeve of FIG. 13, FIG. 16 is a sectional view of the distance sleeve of FIG. 15 along the line A-A, FIG. 17 is a first sequence of a connection method of two components with the distance sleeve in a side sectional view, FIG. 18 is a second sequence of a connection method of two components by means of the distance sleeve and a partially screwed in fastening screw in a side sectional view, FIG. 19 is a third sequence of a connection method of two components by means of the distance sleeve being installed completely in a side sectional view, FIG. 20 is a perspective view of another embodiment of the distance sleeve in a sectional side view comprising an insertion tool, FIG. 21 is a first sequence of a connection method of two components by means of the distance sleeve according to FIG. 20 in a side sectional view, FIG. 22 is a second sequence of a connection method of two components by means of the distance sleeve according to FIG. 20 while adjusting the inner sleeve by means of the insertion tool in a side sectional view, FIG. 23 is a third sequence of a connection method of two components by means of the distance sleeve according to FIG. 20 with a completely adjusted inner sleeve for bridging a distance between the two components to be joined together in a side sectional view, and FIG. 24 is a flowchart of an embodiment of a connection method of two components with the distance sleeve according to the embodiments.

5. DETAILED DESCRIPTION

FIGS. 1 to 5 show embodiments of the adjustable distance sleeve 1; 1' in the not installed condition. In FIGS. 9 and 10, cross-sectional views of embodiments of the adjustable distance sleeve 1; 1' are shown in the partly installed condition. The adjustable distance sleeve 1; 1' comprises an outer sleeve 10 having a specific outer contour and a central thread opening 12. In axial direction of the outer sleeve 10, i.e. in the pathway direction of the thread opening 12, an axial collar 18 extends from a first radially extending face side 16. At the axial collar 18, an abutment disc 20 is arranged. According to different embodiments of the present invention, the abutment disc 20 is connected to the axial collar 18 in a rotation-proof manner by gluing, via a thread connection, by shrinking, by a non-rotationally symmetric receiving groove with complementary inner bore of the disc or in any other manner. It may be also preferred to form a round axial groove in the face side 16 of the outer sleeve 10 adjacent to the axial collar 18. In this groove, the fastening edge 26 is insertable and fastenable by gluing or by a press-fit or by welding. According to a further embodiment, the abutment disc 20 is formed integrally with the axial collar 18. The abutment disc 20 may comprise a fastening ring 26 which is arranged rigidly on the axial collar 18. Further, the abutment disc 20 comprises a fastening or abutment surface 24 facing the face side 16 of the outer sleeve 10. The face side 16 and the fastening surface 24 lie at least partly opposite to each other and define between each other a fastening gap or a fastening gap portion for receiving the first component B1. As fastening gap portion, generally, the space is understood which is axially limited by the face side 16 and the fastening edge 26. In radial direction, no limitation of the limiting gap portion is assumed, so that it may extend radially beyond the outer sleeve.

It may be further preferred in at least some implementations to arrange on the fastening surface 24 at least one fastening feature 22. This fastening feature 22 may be a rotation-lock web, which engages in a component opening 90 (see below) which is arranged in the fastening gap portion.

The fastening feature 22, which may consist of a ramp surface according to a further embodiment (not shown) may be arranged on a tongue-like radial extension 25 of the fastening surface 24. Generally, it may be preferred that the face side 16 of the outer sleeve 10 as well as the fastening surface 26, here in combination with the radial extension 25, have a non-round shape which are not arranged symmetrically opposite to each other but which are displaced by a rotation angle with respect to each other. In this way, the above defined fastening gap portion serves for holding an edge of the component opening 90 in that the face side 16 is supported on one side of the component B1 and the fastening surface 24 is supported on the opposite side of the component B1, wherein the edge of the fastening opening 90 connects both component sides.

According to a further embodiment, the non-round component opening 90 is adapted in its shape to the outer contour of the outer sleeve 10. Thereby, the outer sleeve 10 is insertable into the component opening 90 by means of a linear movement until the fastening surface 24 and/or the fastening features extending therefrom are supported at component B1 (step S1, see FIG. 24). In the present case (see FIGS. 6 and 7), the outer sleeve may comprise a rectangular outer contour while the component opening 90 in component B1 comprises also a rectangular shape adapted thereto. The supporting of the fastening surface 24 and/or the fastening features may be possible due to the asymmetric arrangement of face surface 16 and fastening surface 24. If the distance sleeve 1; 1' is now rotated around its longitudinal axis by a specific angle (step S2, see FIG. 13), the symmetrical alignment between the outer sleeve 10 and the component surface 90 is dissolved or removed. At the same time, free spaces of the component opening 90 are created in the portion of the fastening feature 22, here the rotation-lock web 22, which can snap into the component opening 90 as a result (step S3). Thus, the distance sleeve 1; 1' is fastened in axial direction between face side and fastening surface 24. The engagement of the rotation-lock web 22 into the non-round component opening 90 prevents a rotation and, thus, a releasing of the outer sleeve 10 from the component opening 90 (see FIG. 6 to 8).

It may be also preferred to provide as fastening feature 22 a ramp surface (not shown). During rotation around the longitudinal axis of the distance sleeve 1; 1', it serves for locking or fastening the distance sleeve 1; 1' to the component B1 by means of a press-fit (step S4). Thereby, it is avoided that the ramp surface (not shown) snaps into a free space of the non-round component opening 90.

Within the thread opening 12, an inner sleeve 360; 30' can be axially displaced in its position by means of rotation (step S5). To this end, an outer thread 32 is provided on a radial outer side. In the interior, the inner sleeve 30; 30' comprises a through-opening 34 for receiving a fastening screw 92. According to at least some implementations, it may be preferred that the through-opening 34 does not comprise a dragger so that the length of the distance sleeve is not adjustable by means of a rotation of the fastening screw 92.

According to a further embodiment, the inner sleeve 30; 30' comprises a drive means 36 at an axial face side facing the outer sleeve 10. In the same way, it may be preferred to provide a drive means (not shown) at the oppositely arranged face side as an alternative thereto or in addition thereto.

As can be seen in the FIGS. 6 to 10, the drive means 36 may consist preferably of a gearing. If an tool which is formed appropriate thereto engages this gearing, a form-fit rotation connection results for the rotation of the inner sleeve 30; 30' within the outer sleeve 10. As can be clearly seen based on FIGS. 6 to 10, the length of the distance sleeve 1; 1' is adjustable by means of the one-sided access from the side of component B1. If the distance sleeve 1; 1' is fastened in a support B1 of a vehicle frame, the installation of the distance sleeve solely from the interior of the vehicle may be possible.

According to a further embodiment, the inner sleeve 30; 30' comprises a polygonal outer contour 33, 35, 36'. The polygonal contour may comprise a plurality of radial elevations 33. On the radial outer portions of the elevations 33; 33', the outer thread 32 is provided corresponding to the thread opening 12. Axial free spaces 35; 35' are present between the elevations 33; 33', especially also in the screwed-in condition in the outer sleeve 10. These free spaces 35; 35' serve as drive means 36; 36' for a tool engaging therein for rotating the inner sleeve 30; 30'. These free spaces 35; 35' may ensure that the inner sleeve 30; 30' would only be adjustable from the vehicle interior or generally only from a face side of the distance sleeve 1; 1'.

According to a further embodiment, the through-opening 34 comprises an inner drive means (not shown) may be in the shape of a polygonal structure. Accordingly, it can be engaged by a square or Allen key and the length of the distance sleeve 1; 1' can be adjusted.

According to a further embodiment, the inner sleeve 30 comprises within a radial outer range adjacent to an abutment disc 40 a radial outer drive means 38. This may be formed by a polygonal structure. By means of this drive means 38, the inner sleeve 30; 30' is adjustable via an opening in the second component B2 or generally from the side facing away from the outer sleeve 10.

According to a further embodiment (not shown), the inner sleeve 30; 30' does not comprise a drive means. For rotating the inner sleeve 30; 30', a tool may be inserted into the through-opening 34 and a releasable frictional connection with the inner sleeve 30; 30' is established. After completion of the rotation of the inner sleeve 30; 30' or adjustment of the length of the distance sleeve, respectively, the tool is removed from the through-opening 34.

During the axial displacement of the inner sleeve 30; 30' in the direction of the second component B2, a roof cover of a motor vehicle, the abutment disc 40 may provide a supporting portion at the second component B2. For this reason, the abutment disc 40 may consist of a flexible plastic and is arranged in a groove of the inner sleeve 30; 30'.

The FIGS. 6 to 10 show in an embodiment the installation of the distance sleeve 1; 1' between the components B1 and B2. As can be seen based on FIG. 6, the component opening 90 is formed rectangular. Adapted to the shape of the component opening 90, the contour of the outer sleeve 10 is also rectangular. The outer dimensions of the outer sleeve 10 are somewhat smaller as the dimensions of the component opening 90 so that the outer sleeve 10 is insertable into the component opening 90. Due to the rectangular shape of the outer sleeve 10, at least four corner portions of the face side 16 are provided for fastening and supporting at component B1. The here described method applies in the same way to the distance sleeve 1'.

The abutment disc 20 may have an oval or elliptic shape. The fastening features or the rotation-lock webs 22, respectively, may be spaced from each other only as far as the diagonal of the component opening 90 is long. It may be also preferred to form the abutment disc 20 round. In this embodiment, the rotation-lock webs 20 are arranged on radial extensions 25 on which the rotation-lock webs 22 are arranged spaced from each other also maximally with the length of the diagonal of the component opening 90. The diameter of the abutment disc 20 or the radial extension perpendicular to the connection line between the rotation-lock webs 22, respectively, is somewhat larger as the side length of the rectangular component opening 90. In this way, it is ensured that the fastening surface 24 is supported on the component side facing away from the outer sleeve 10 even during the rotation of the outer sleeve 10 around its longitudinal axis and it is not displaceable through the component opening 90 (see FIG. 7).

After the outer sleeve 10 has been inserted into the component opening 90, the abutment disc 20 is rotated in rotation-proof connection with the outer sleeve 10 until the rotation-lock webs 22 are each aligned to a corner of the component opening 90 and snap there into the free space of the component opening 90 (see FIG. 8). At the same time, the fastening surface 24 is still supported at component B1 without getting through the component opening 90.

After the distance sleeve 1; 1' has been installed in the component opening 90 axially tight and rotation-proof—this is also shown in FIG. 9—the inner sleeve 30; 30' is rotated out of the outer sleeve 10. This may take place with one of the above described drive means only on one side through the component opening 90.

According to a further embodiment, the rotation and adjustment of the inner sleeve 30; 30' takes place from both sides or only from the side facing away from the component B1 (see FIGS. 11 and 12). According to FIGS. 11 and 12, the inner sleeve 30; 30' may be adjusted by means of the drive means 38 or by means of an interiorly arranged drive means in the through-opening 34 via an opening in the component B2.

The adjustment of the inner sleeve 30; 30' and, thus, of the desired length of the distance sleeve 1; 1' is completed when the abutment disc 40 abuts the second component B2, for example a roof cover or a roof body. Thereafter, a roof construction, a roof rail or bar, a roof rack or another body part D may be screwed to component B1 by means of the fastening screw 92. To this end, a disc 94 with nut 96 is used.

The installation of the distance sleeve 1; 1' is realizable with the above described drive means in the same way. Further, it may be preferred to produce the distance sleeve of plastic, fiber reinforced plastic or metal or of a combination of the mentioned materials. Plastic as material choice is due to the production effort, its weight and the flexibility in the combination with other materials and surrounding conditions.

A further embodiment of the distance sleeve 1" is shown in FIG. 13 in a perspective view. In contrast to the above-described constructions of the distance sleeve 1; 1', the distance sleeve 1" comprises an inner sleeve 30" with a friction element 80. Apart from the friction element 80, the inner sleeve 30" comprises a selection or the respective combination of the structural features of the above described embodiments of the inner sleeve 30; 30'.

The friction element 80 is arranged adjacent to the axial end face of the inner sleeve 30", which is displaced into the outer sleeve 10 when the length of the distance sleeve 1" is adjusted. The friction element 80 may be formed annularly and consists of an elastically deformable material, such as, for example, an elastomer or rubber. The annular friction element 80 is adapted in its outer diameter to the inner diameter of the inner sleeve 30" in such a way that the friction element 80 may be held there in a force-fit manner after a pressing in into the interior of the inner sleeve 30". To this end, the outer diameter of the friction element 80 may be designed to be somewhat larger than the inner diameter of the inner sleeve 30". Alternatively or additionally, the inner wall of the inner sleeve 30" comprises a circumferential radial web 39 or a plurality of uniformly spaced radial webs 39, which forms/form an undercut catch for the friction element 80. In order to support the retention of the friction element 80 at the radial web 39, a circumferential radial recess or groove 82 may be provided at the radial outer side of the annular friction element 80. The radial recess 82 may be limited in the axial direction adjacent to the end face of the inner sleeve 30" by a circumferential radial collar 84. This radial collar 84 can be omitted if the friction element 80 is not arranged at the end face of the inner sleeve 30", but displaced into the interior of the inner sleeve 30" in the axial direction.

Further, several radial elastic rings, such as e.g. O-rings or radial sealing rings, may be provided as dragging member within the through-opening 34. The O-rings or similarly shaped elastic dragging members may be also arranged into grooves adapted to their shape and/or arranged therein at least by frictional engagement. In the case of several rings, the individual grooves may be reduced in diameter such that the individual rings act in their sequence in the function of an inner sleeve having several sealing edges and a slight insertion cone in the mounting direction.

In addition, the radial recess 82 is limited in the axial direction inwardly into the interior of the inner sleeve 80 by a radial bead 86. This radial bead 86 is qualified by radial bulgings to the inner wall of the inner sleeve 30" and into the through-opening 34 of the inner sleeve 30". As a result, the radial bead 86 realizes two functions. First, it supports the retention of the friction element 80 on the radial web 39 in that the radial bulge 86 and the radial collar 84 form opposite axially acting undercuts. Furthermore, the radial bead 86 projects so far into the interior or into the through-opening 34 of the inner sleeve 30" that the inner diameter of the through-opening 34 in the portion of the radial bead 86 is smaller than an outer diameter of a fastening screw 92 to be received in the through-opening 34. Thus, the radial bead 86 of the friction element 80 generates a frictional connection with the fastening screw 92 while screwing the fastening screw 92 into the distance sleeve 1'", whereby the friction element 80 acts as dragging member for the inner sleeve 30". If the fastening screw 92 is screwed into the inner sleeve 30" during installation of the distance sleeve 1" between the two components B1, B2, the fastening screw 92 rotates the inner sleeve 30" via the friction element 80 and displaces it in the direction of the second component B2 (see FIGS. 17-19). This displacement is achieved due to the counter-rotating outer thread 32 of the inner sleeve 30" compared to the thread of the fastening screw 92. As soon as the inner sleeve 30", its abutment disc 40, abuts the second component B2, the fastening screw 92 overcomes the frictional retaining moment of the friction element 80 and may be further screwed in without further rotating the inner sleeve 30".

According to a further embodiment, the elastic friction element 80 comprises a radially inwardly protruding sealing lip 88, which extends from the end of the friction element 80 which is arranged axially within the inner sleeve 30", in particular from the radial bead 86. The sealing lip 88 is provided continuously circumferentially on the friction element 80. Due to the elastic material of the friction element 80 and thus of the sealing lip 88, it abuts sealingly at the fastening screw 92. In this way, an entering of dust, liquid and other contamination through the through-opening 34 for fastening the fastening screw 92 and in a connected interior of a composite component is avoided or at least reduced. In this context, it may be also preferred to make the radial bead 86 sufficient in its radial dimensions instead of the sealing lip 88, so that in addition to the frictional engagement with the fastening screw 92, the sealing function is ensured via the radial bead 86.

A further embodiment of the inner sleeve 30'" of the distance sleeve 1'" can be seen in FIG. 20 in a side sectional view. While the inner sleeve 30'" has in its structural design an arbitrary selection of the features of the above-described embodiments of the inner sleeve 30; 30'; 30" without friction element 80, it comprises an insertion cone 37 at least adjacent to one of its axial end faces. The insertion cone 37 provides a contact surface for a rotary tool 70 which extends inclined into the through-opening 34. The rotary tool 70 may have at least one rotatable cone 72 with a radially outer friction surface 74. The friction surface 74 forms with the insertion cone 37 a frictional connection, so that a rotation of the rotary tool 70 is transferable onto the inner sleeve 30'''. An angle of inclination of the insertion cone 37 and the cone 72 may be similarly large in order to be able to provide the largest possible contact surface and friction surface between the insertion cone 37 and the cone 72. According to the disclosure, the cone 72 may be arranged on an axis 76 in order to be able to rotate the insertion tool 70 manually or automatically. It may be also preferred that the cone 72 has an integrally formed axis 76.

The cone 72 may be made of an elastic material, such as an elastomer, rubber, microcellular rubber or the like. It also may be preferred to make the cone 72 of any material as long as its outer surface or conical surface 74 provides a sufficient roughness or a sufficiently high coefficient of friction for rotating the inner sleeve 30'''.

As can be seen from FIG. 20, it may be preferred to provide the insertion cone 37 only at one of the two end faces of the inner sleeve 30''' or at both. This construction of the inner sleeve 30''' provides the flexibility to adjust the axial position of the inner sleeve 30''' by means of the rotary tool 70 from the side of the second component B2 or from the side of the first component B1. If one adjusts the position of the inner sleeve 30''' from the side of the second component B2 (see FIGS. 21 to 23), the cone 72 of the rotary tool 70 engages through the component opening 98 into the insertion cone 37 of the inner sleeve 30'''. Specifically, the cone 72 engages the side of the inner sleeve 30''' facing the abutment disk 40. By rotating the rotary tool 70, the inner sleeve 30''' is axially displaced and brought into abutment at the component B2 (see FIG. 23).

In the same way, it may be preferred that the rotary tool 70 engages the inner sleeve 30''' from the direction of the first component B1. Specifically, the cone 72 of the rotary tool 70 abuts at the side of the inner sleeve 30''' facing away from the abutment disk 40 (not shown). During the adjusting of the axial position of the inner sleeve 30''' within the outer sleeve 10 the rotary tool 70 thus protrudes into the threaded opening 12 of the outer sleeve 10.

As soon as the desired axial position of the inner sleeve 30''' and thus the supporting length of the distance sleeve 1''' is set in both alternative adjustment possibilities, the rotary tool 70 is removed. As a result, the through-opening 34 of the inner sleeve 30''' is free to screw in the fastening screw 92 and to fasten the at least two components B1, B2 to one another.

The invention claimed is:

1. An adjustable distance sleeve by means of which a distance between a first and a second component is bridgeable by adjusting a length of the distance sleeve, wherein the distance sleeve comprises the following features:
   a. an outer sleeve having a central thread opening,
   b. a hollow cylindrical inner sleeve arranged adjustably in the central thread opening, the inner sleeve having an outer thread at a radial outer side which corresponds to an inner thread of the thread opening, and
   c. an axial collar extending axially from a face side of the outer sleeve at which a radially extending abutment disc is arranged in a rotation-proof manner, wherein
   d. the abutment disc comprises at least one fastening feature extending in the direction of the outer sleeve into a portion between the abutment disc and the outer sleeve by means of which a form-fit rotation lock and/or a force-fit rotation lock can be established in an opening of the first component, in which
   e. the outer sleeve and the abutment disc comprise each an outer contour extending radially beyond the axial collar for forming a fastening gap portion.

2. The adjustable distance sleeve according to claim 1, the abutment disc of which is formed resiliently in the axial direction of the distance sleeve and which comprises at least one rotation-lock web projecting into the fastening gap portion.

3. The adjustable distance sleeve according to claim 1, the abutment disc of which is formed non-resilient in the axial direction and which comprises at least one ramp surface projecting into the fastening gap portion.

4. The adjustable distance sleeve according to claim 1, the inner sleeve of which comprises a threadless through-opening and at least one drive means by means of which the inner sleeve is rotatable in the outer sleeve and the length of the distance sleeve is adjustable.

5. The adjustable distance sleeve according to claim 4, in which the drive means is arranged within the through-opening by means of a non-round inner contour.

6. The adjustable distance sleeve according to claim 4, in which the drive means is arranged at an axial face side of the inner sleeve, which makes a form-fit rotation connection with a tool possible.

7. The adjustable distance sleeve according to claim 4, in which the drive means is arranged at the radial outer side of the inner sleeve, which comprises a polygonal or a non-round contour having a plurality of radial elevations on which the outer thread of the inner sleeve is arranged while a free space as drive means for the engagement or abutment of a tool is present between adjacent radial elevations.

8. The adjustable distance sleeve according to claim 1, the inner sleeve of which comprises a threadless through-opening and no drive means, wherein the inner sleeve is rotatable manually or by means of a frictional connection between a tool and an inner wall of the through-opening.

9. The adjustable distance sleeve according to claim 8, in the inner sleeve of which at least one annular elastic dragging member is arranged, which narrows the through-opening of the inner sleeve.

10. The adjustable distance sleeve according to claim 9, the dragging member of which has a radially inwardly protruding sealing lip, which is arranged circumferentially at the dragging element and can sealingly abut a fastening screw.

11. The adjustable distance sleeve according to claim 8, the inner sleeve of which comprises adjacent to an end face an insertion cone into the through-opening of the inner sleeve, by means of which a frictional engagement with a rotary tool can be produced.

12. A connection between at least a first component and an adjustable distance sleeve according to claim 1, in which the first component comprises a non-round component opening and an edge of the component opening is fastened in a fastening gap of the distance sleeve solely by axially inserting and subsequent rotating of the distance sleeve in the component opening.

13. The connection according to claim 12, in which an outer contour of the outer sleeve of the distance sleeve is adapted to the non-round component opening such that in a first rotation angle orientation around a longitudinal axis of the distance sleeve, an axial inserting of the distance sleeve into the non-round component opening is ensured, while in a second rotation angle orientation of the distance sleeve, an axial removing of the distance sleeve from the non-round component opening is prevented by form-fit.

14. The connection according to claim 12, in which the distance sleeve is supported at a second component by means of a rotatingly adjustable inner sleeve and the first and the second component are connected to each other by means of a fastening screw extending through the distance sleeve.

15. A connection between a first and a second component by means of an adjustable distance sleeve according to claim 1, through which a fastening screw extends.

16. A method for installing a distance sleeve according to claim 1, into a non-round component opening of a first component, the method comprising the following steps:
  a. inserting the outer sleeve of the distance sleeve, preferably with an inner sleeve into the non-round component opening contour of which is adapted to the non-round component opening, until an edge of the non-round component opening is supported on the abutment disc of the distance sleeve,
  b. rotating the outer sleeve around a longitudinal axis so that the edge of the non-round component opening is received in the fastening gap portion between the abutment disc and the outer sleeve and thereby
  c1. snapping-in of a rotation-lock web projecting into the fastening gap portion into the non-round component opening or into a lock opening or into a lock groove at the first component and/or
  c2. clamping a ramp surface projecting into the fastening gap portion at a side of the first component facing the ramp surface.

17. Method according to claim 16, in which the first component is a support in the roof portion of a vehicle body at which a roof body is supported by means of an inner sleeve of the distance sleeve, wherein the distance sleeve is installed in the component opening only from one side opposite the roof body.

18. Method according to claim 16, comprising the further step:
  rotating the inner sleeve of the distance sleeve for bridging a distance between the first component and a second component with
  i. a tool that establishes a frictional connection in a through-opening of the inner sleeve without drive means, or
  ii. a tool that establishes a form-fit rotation connection with a drive means at an axial face side of the inner sleeve, or
  iii. a tool that establishes a form-fit rotation connection with a drive means at a radial inner side or a radial outer side of the inner sleeve.

19. Method according to claim 16 with the further step:
  establishing a sealing connection between the fastening screw and a sealing lip extending circumferentially around the fastening screw in the through-opening of the inner sleeve.

* * * * *